Aug. 22, 1950 A. McMILLAN ET AL 2,519,391
CONTROL FOR CONCRETE MIXERS AND THE LIKE
Filed May 26, 1947 10 Sheets-Sheet 6

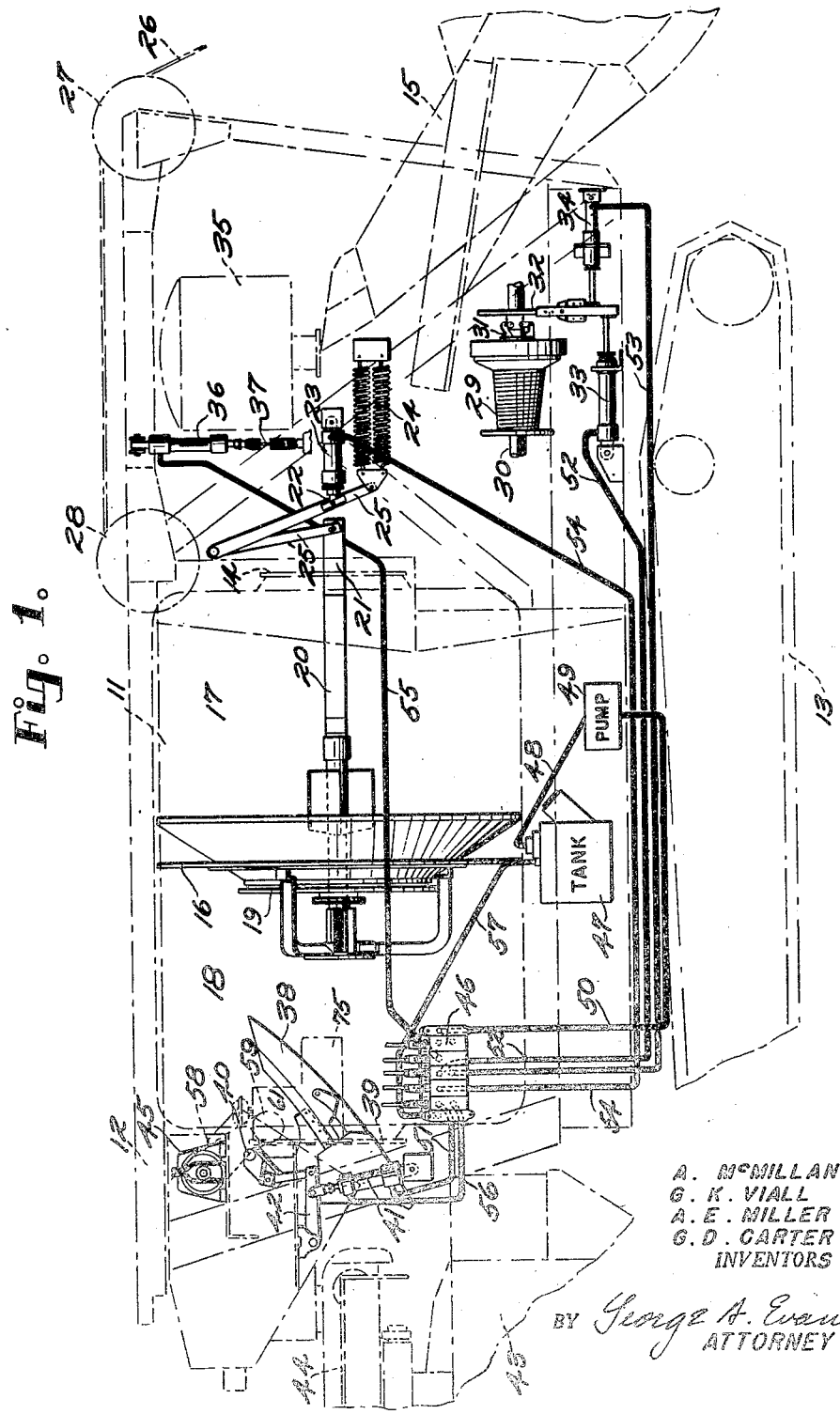

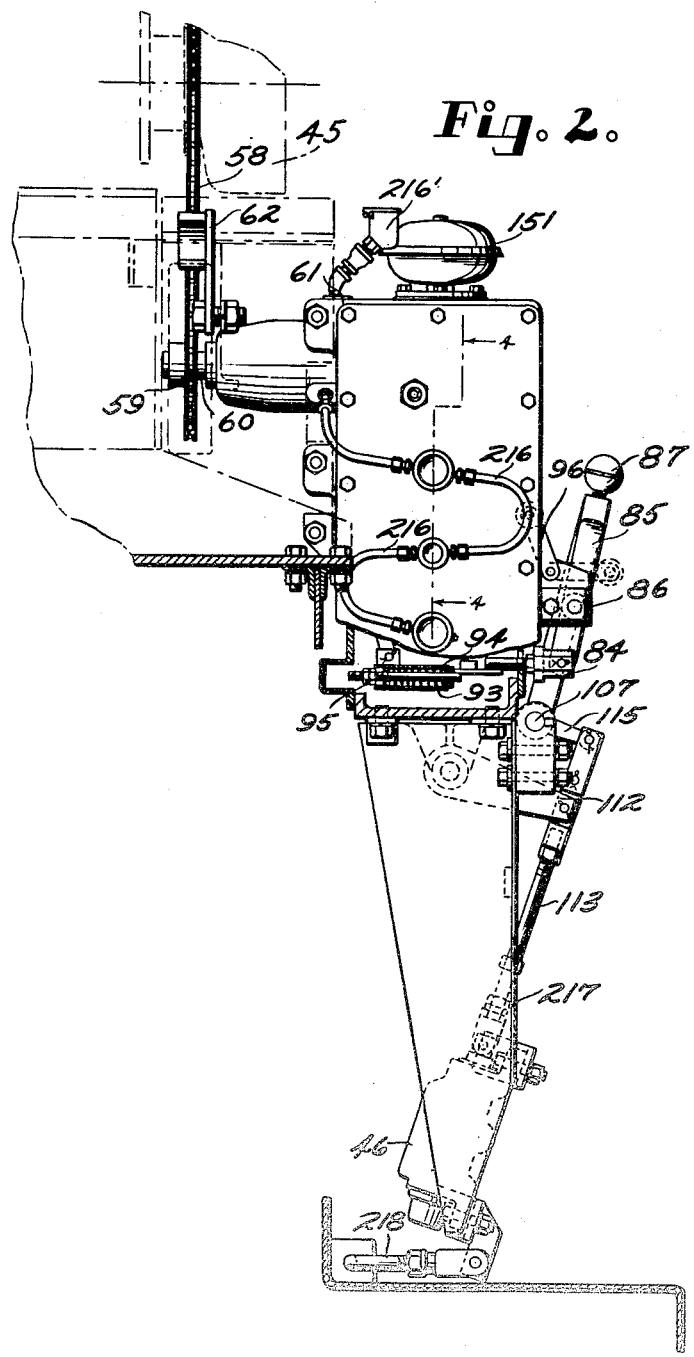

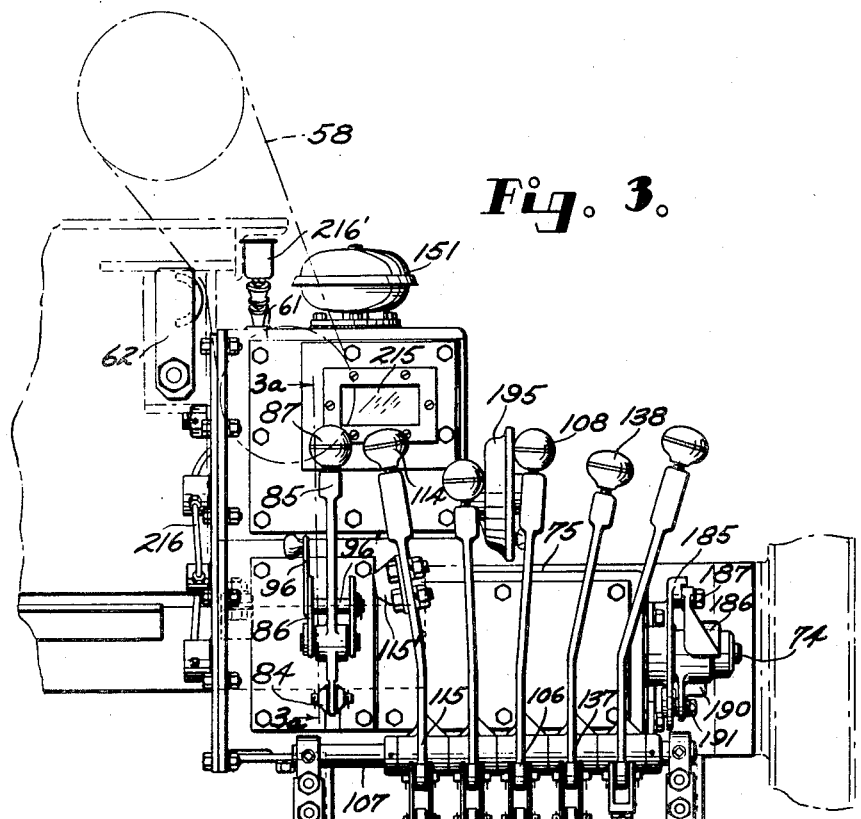
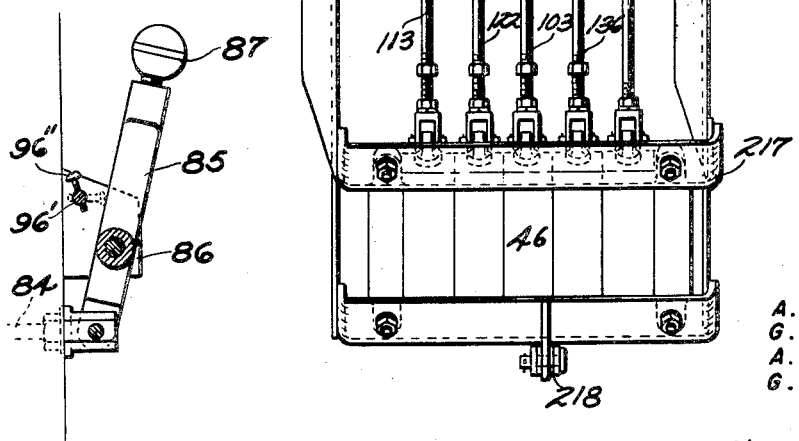

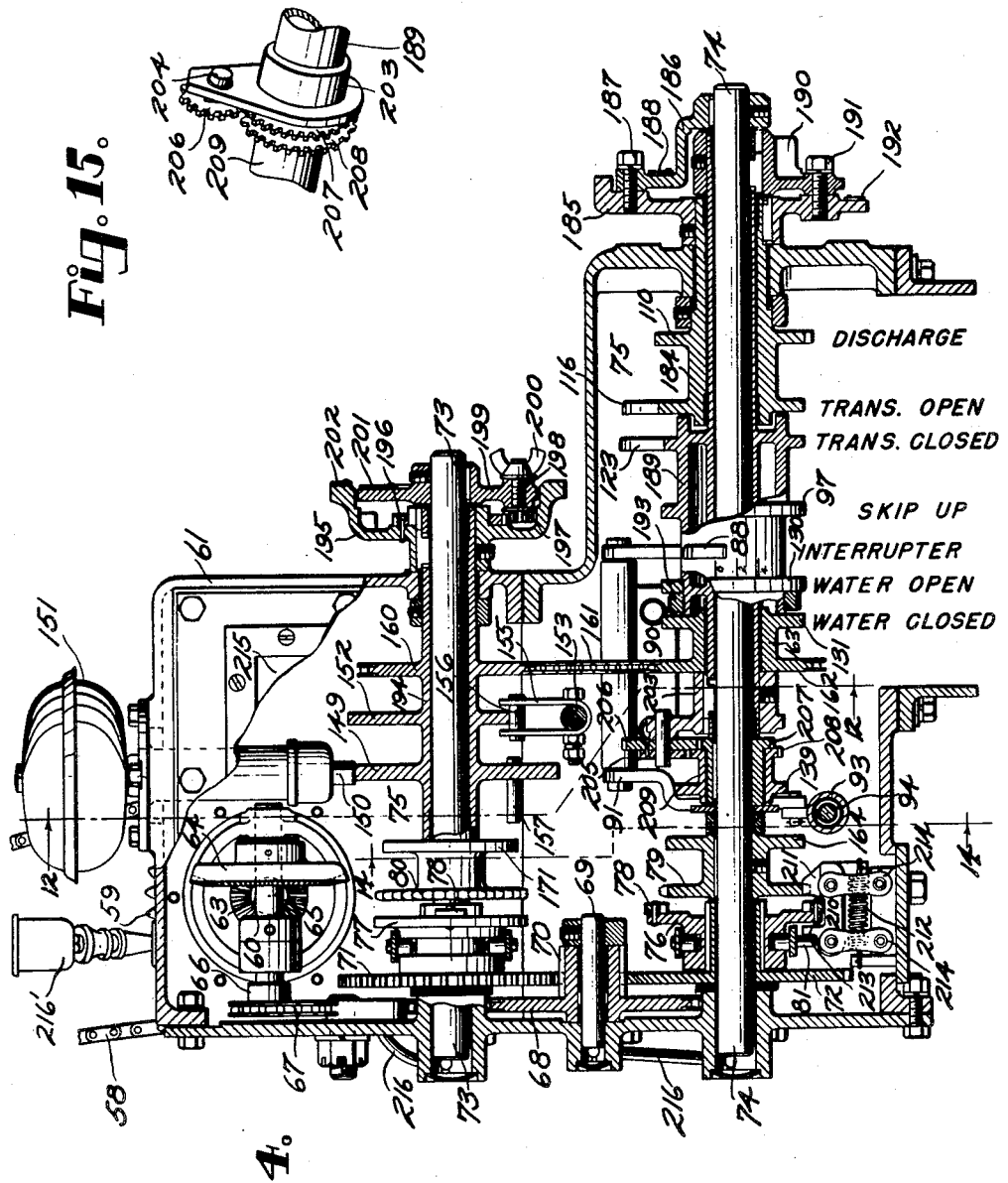

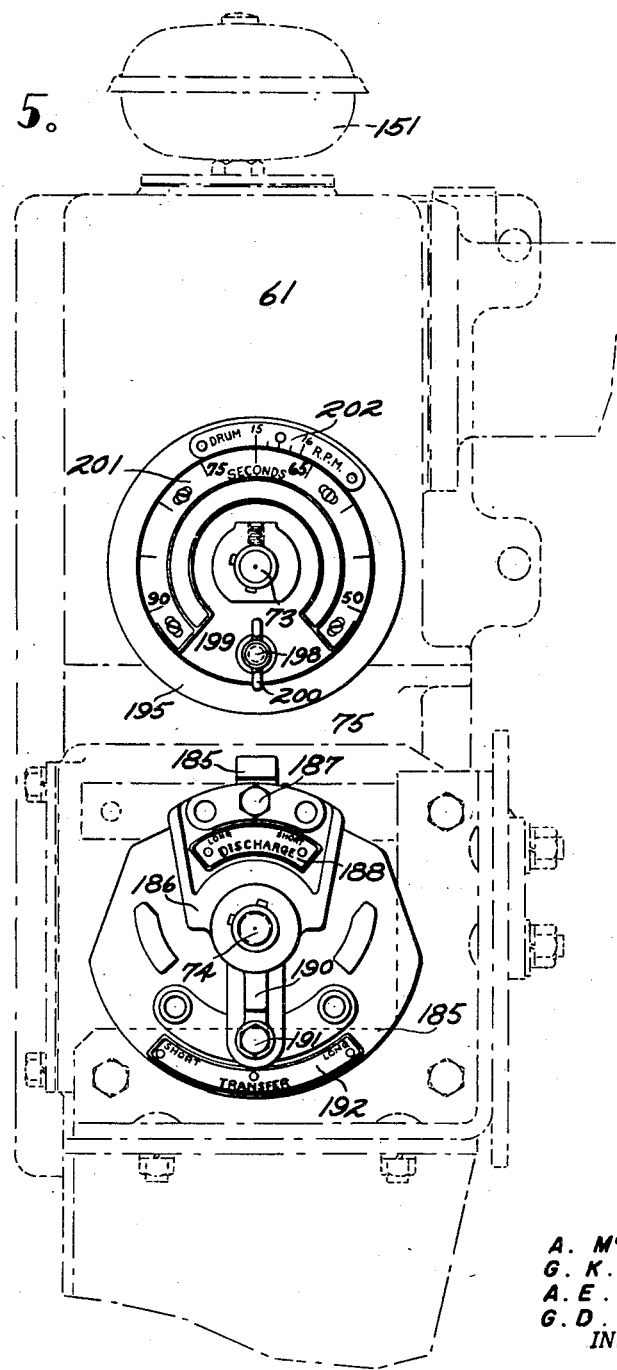

A. McMILLAN
G. K. VIALL
A. E. MILLER
G. D. CARTER
INVENTORS

BY George A. Evans
ATTORNEY

Aug. 22, 1950    A. McMILLAN ET AL    2,519,391
CONTROL FOR CONCRETE MIXERS AND THE LIKE
Filed May 26, 1947    10 Sheets-Sheet 7
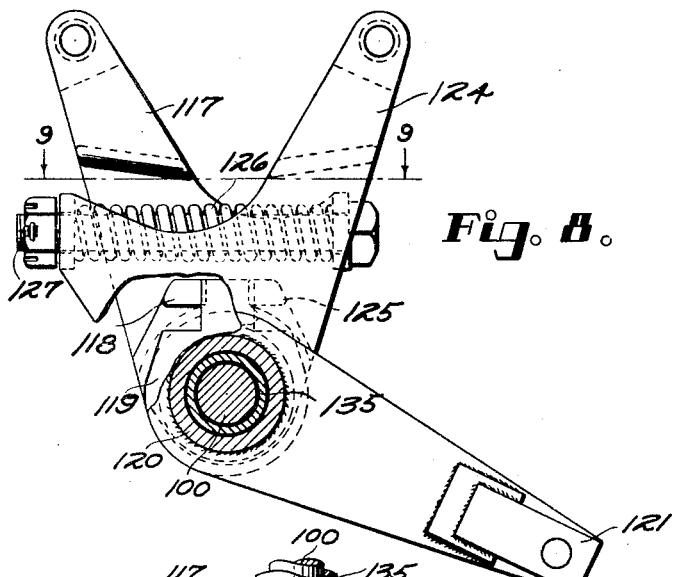
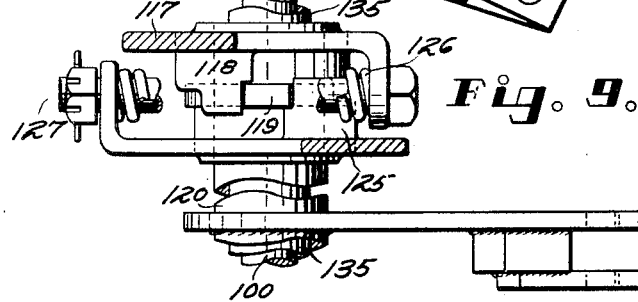
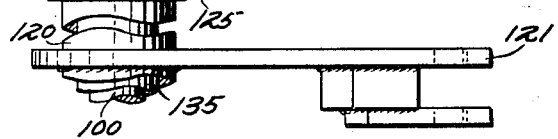
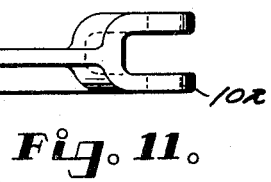
A. McMILLAN
G. K. VIALL
A. E. MILLER
G. D. CARTER
INVENTORS
BY George A. Evans
ATTORNEY

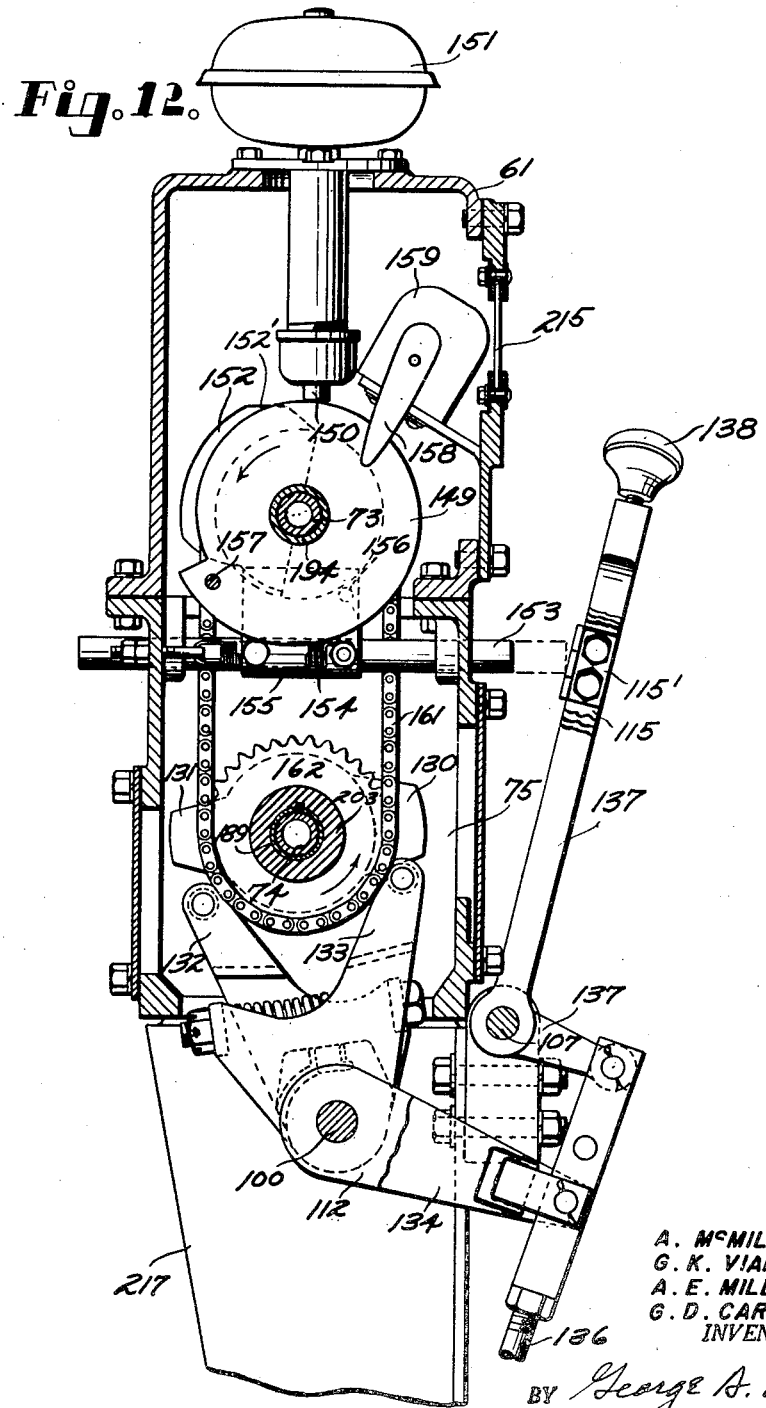

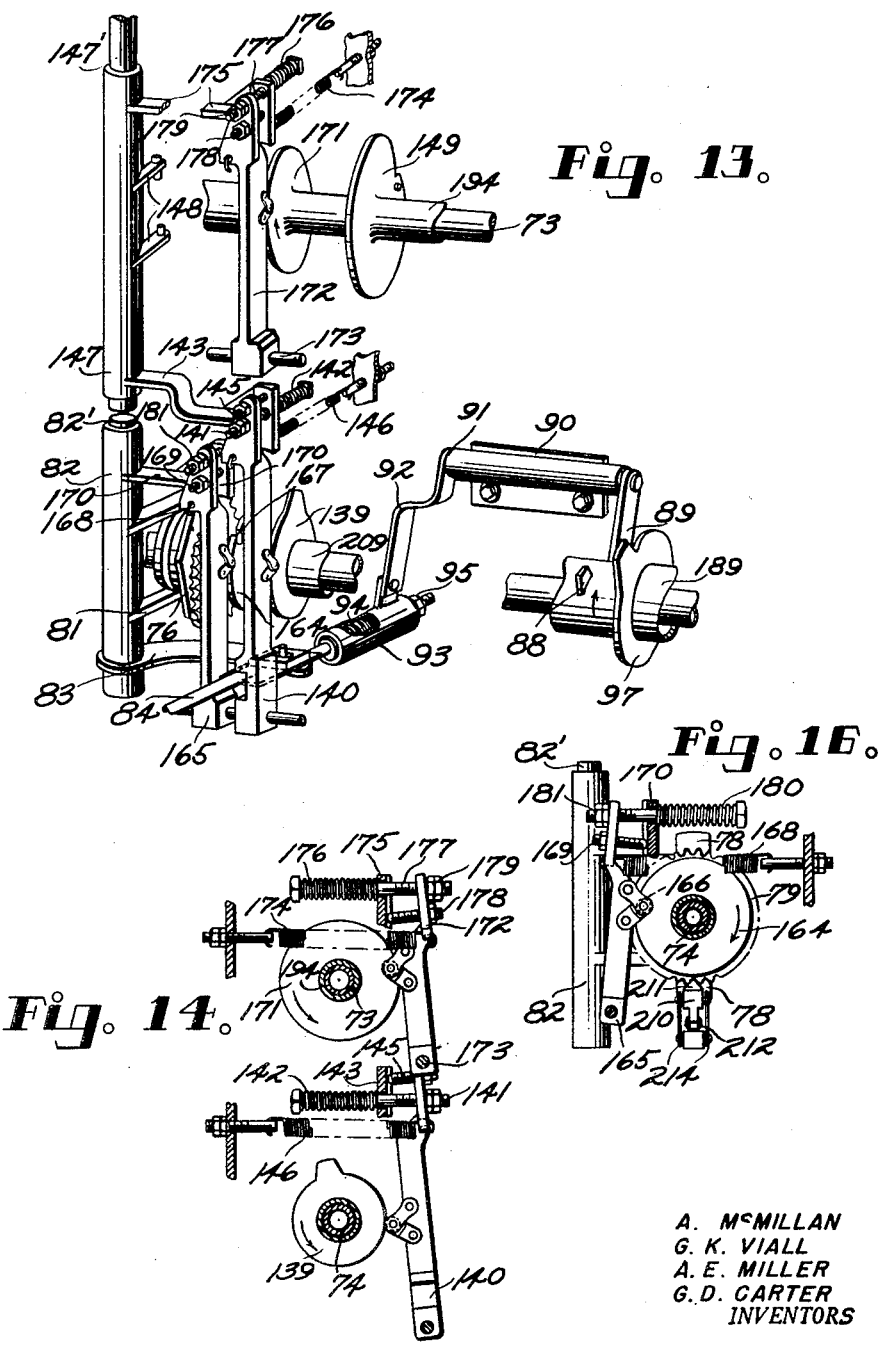

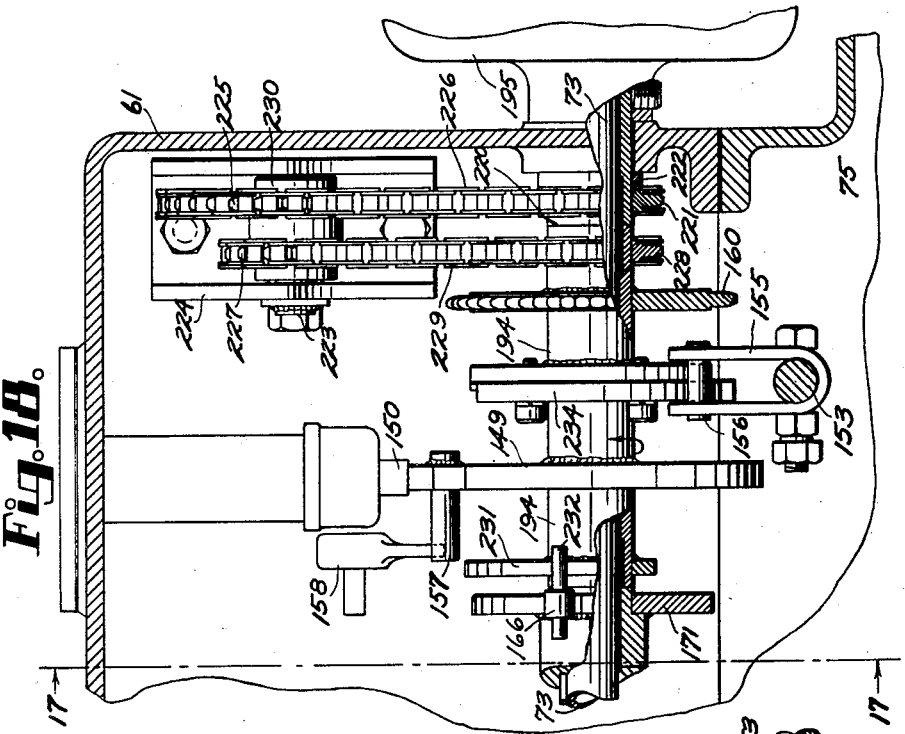
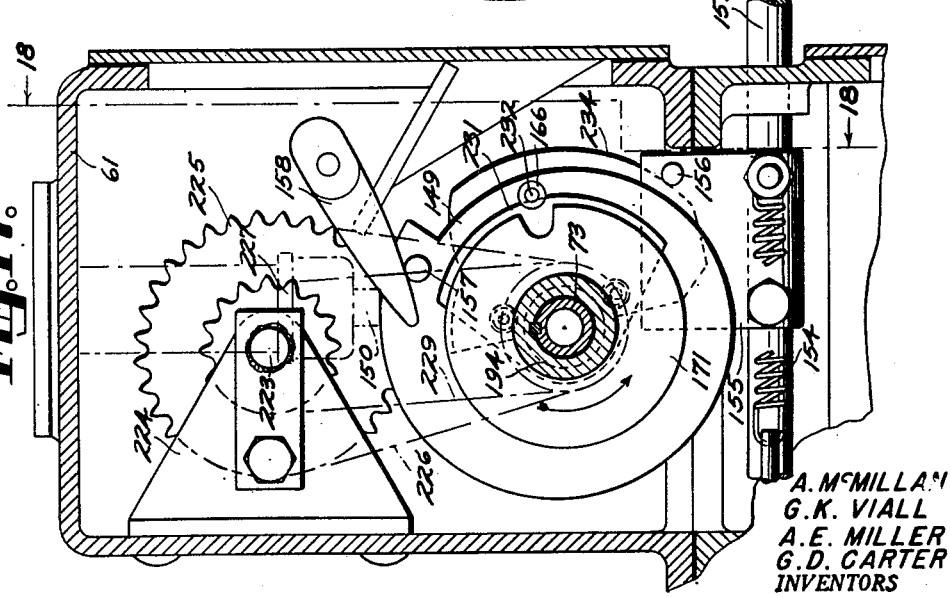

Patented Aug. 22, 1950

2,519,391

UNITED STATES PATENT OFFICE 2,519,391

CONTROL FOR CONCRETE MIXERS AND THE LIKE

Andrew McMillan, Milwaukee, George K. Viall, Shorewood, Arthur E. Miller, Whitefish Bay, and Gerald D. Carter, Milwaukee, Wis., assignors to Chain Belt Company, Milwaukee, Wis., a corporation of Wisconsin Application May 26, 1947, Serial No. 750,544

17 Claims. (Cl. 259—163)

This invention relates to controls for initiating in timed sequence and in novel manner various operations which are repeated in the cycle of operation of a batch mixing machine.

For a number of years emphasis in development of concrete mixers for road paving work has been to increase output while maintaining and improving the quality and uniformity of mixing. To this end, paving drums have been employed utilizing two compartments arranged to mix in sequence the batch of materials passing through the drum. Such arrangements produce considerable time saving because in effect two batches, rather than one, are being mixed at a time. The sequential arrangement of the compartments in actuality results in a partial mix of each batch in each of the compartments. By providing a transfer mechanism between the compartments which prevents transfer while the first compartment is being charged, and also until the second compartment is discharged, the principle of batch operation as contrasted with continuous operation is preserved, i. e., regulated quantities of materials comprising each batch can be mixed for a definite interval of time and uniformity of quantity and quality of the separate batches can be consistently maintained.

These advantages of two compartment mixing drums are well known in the art and automatic mechanism has been provided to relieve the operator of the difficulty of manually having to initiate each of the operations of these relatively high speed machines. By providing automatic means to initiate those functions that are normally non-varying in time sequence, losses in time and undesirable variations in timing are avoided. Moreover the operator is free to devote more attention to controlling manually the functions of a varying nature such as the placing of concrete with the boom and bucket, the maneuvering of the machine as paving of a given area of ground progresses, and the like.

The time required to mix a batch of concrete may vary considerably on different jobs; so also does the time required to discharge the drum and the time to transfer the batch from one compartment to the other where two compartment drums are employed. The differences in character of the aggregates, the quantity of water used and the presence of grades or hills are some of the principal factors which cause these variations. Automatic controls for machines which are moved from one job to another, where differences in mixing specifications and operating conditions prevail, must be capable of adjustment to meet such changes.

Means for adjusting the control instrumentalities of machines heretofore employed have been extremely cumbersome and complicated, requiring a high degree of judgment and skill on the part of the mechanic who undertakes it, as well as a very intimate knowledge of the construction of the particular machine involved. It is an important object of the present invention to provide an improved control instrumentality such that adjustments to meet different mixing time requirements and job conditions may be made in a much simpler, easier and more foolproof manner.

In two compartment paving drum operations, there are really two cycles of operation involved, and for convenience these will be designated the mixing cycle and the control cycle. The mixing cycle is the cycle which is repeated at definite intervals during the function of the machine, and controls the actual period of time during which mixing occurs. Normally, there is associated with the mixing cycle means for positively preventing discharge of the contents of the drum prior to completion of a definite, predetermined period of time set by the engineering specifications for the job. The mixing cycle is normally inaugurated at the moment when the drum is being charged with the concrete producing ingredients.

The control cycle embraces a different period of time than the mixing cycle, as it embraces the cycle of the functions controlling the progress of the batches through the drum. The control cycle may be longer or shorter than the mixing cycle, and these may be overlapping since during the control cycle, not only does the mixing cycle or a portion of it occur, but also the additional operations of discharging of the drum contents and charging of the drum. In some instances the mixing cycle on two different jobs will remain constant, but the time required for these other operations which are part of the control cycle will vary, and in order to get maximum output of the machine, the control cycle must be capable of adjustment independently of the mixing cycle. Also, if the mixing cycle is controlled as part of the operation of the control cycle, compensation must be made for adjustment of instrumentalities in the control cycle in order to maintain the mixing cycle constant.

Although some mixing inevitably occurs during the process of transferring batches from one compartment of the drum to the other, many specifications insist that the transfer time be excluded from the mixing time, and hence what is termed a "penalty" is imposed on the machine. To meet such situations, the mixing cycle must be capable of further adjustments independently of the cycle control, for obviously whether a "penalty" is imposed or not, the time for operation of the functions controlled by the control cycle will not be affected thereby. The present invention provides improved means whereby such adjustments may be made.

In the present embodiment of the invention, the control cycle is started just after the completion of the mixing cycle. Hence before the mixing cycle is inaugurated, the drum must be discharged, and charging mechanism, such as a skip brought to a charging position, and the ingredients charged into the drum. The control cycle could, of course, be started at any time after completion of one mixing cycle, and prior to completion of the next, such for instance as the moment when the charging mechanism is set in operation, in which event the cycle would run to a later period of time and include as its last operation the functioning of the discharge device. The present invention is not dependent upon where the control cycle starts, and is intended to cover broadly the correlation of functions rather than any particular cycle of operation.

It is desirable that each control cycle should be started manually and this means that either the inauguration of charging or of discharging, depending on where the cycle starts or ends, will take place automatically. There is some danger in this, for instance if the skip be set in upward motion automatically, that the loading trucks may not be removed therefrom. Similarly, if the discharge function is automatic, the time required for suitable distribution of the batch by the distributing means may be unduly restricted on account of the necessity of relatively quick return of the bucket to avoid deposition of a batch directly on the ground.

The present invention provides means for automatically interrupting the operation of the control cycle just prior to the time when any such operation would if continued possibly produce an undesirable condition, and it further provides means whereby the cycle may be easily set back in operation once the operator is satisfied that it may safely proceed. Alternately if the operator does not want the cycle interrupted, he can, with the mechanism of the present invention, prevent its interruption, but it requires a positive act on his part, which is desirable from a standpoint of efficient results, as well as a source of mental relief to the operator.

The functioning of the automatic interrupter does not interfere with the proper timing of any subsequent functions in the control cycle, nor does it affect the mixing cycle adversely.

Other objects and advantages of the invention will manifest themselves in the following detailed description and by reference to the accompanying drawings which illustrate a preferred embodiment of the various coacting elements and combinations.

In the drawings:

Fig. 1 is a side elevation of the paving machine showing the arrangement of the various instrumentalities subject to control functions;

Fig. 2 is an end view of the control box and housing for the fluid valve actuating members, with parts of the housing broken away;

Fig. 3 is a front view of the mechanism shown in Fig. 2;

Fig. 3a is a section taken on line 3a—3a of Fig. 3;

Fig. 4 is a section taken on the line 4—4 of Fig. 2;

Fig. 5 is an end view taken from the right of the mechanism shown in Fig. 3;

Fig. 8 is a section taken on the line 8—8 of Fig. 7;

Fig. 9 is a section taken on the line 9—9 of Fig. 8;

Fig. 10 is a section taken on the line 10—10 of Fig. 7;

Fig. 11 is a section taken on the line 11—11 of Fig. 10;

Fig. 12 is a section taken on the line 12—12 of Fig. 4;

Fig. 13 is a perspective view of the cams and clutch actuating levers for controlling the cycle control and mixing control shafts;

Fig. 14 is a section taken on the line 14—14 of Fig. 4, showing the mixing control actuating and stopping mechanism;

Fig. 15 is a perspective view of the planetary gear mechanism for compensating the adjustment of the mixing control cycle in response to adjustment of the cycle control;

Fig. 16 is a side elevation of the cam and mechanism for starting and stopping the cycle control;

Fig. 17 is a section through the control box showing a modified form of apparatus to produce a longer mixing cycle; and Fig. 18 is a section taken on line 18—18 of Fig. 17.

Figure 6:
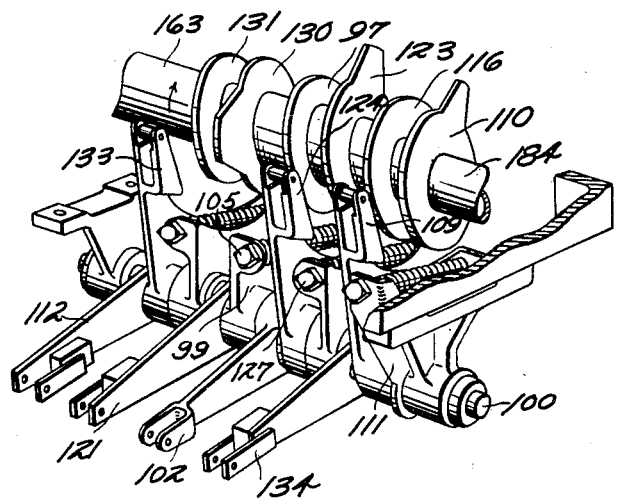
Fig. 6 is a perspective view of the assembly of the cam and valve levers actuated by the control cycle.

For the purpose of illustration, the invention is shown in the drawings as applied to a concrete mixer having a two-compartment drum, although it will be understood that many of its features can be utilized in different applications, for instance in one-compartment drums, or wherever automatic control of sequential operations produced by such a mechanism is desirable.

General arrangement of operating functions

The paving machine is illustrated generally in Fig. 1, and comprises the drum 11 mounted for rotation in a frame 12 which is supported on crawler tracks 13 that propel it along the ground. One end of the drum is provided with an opening 14 through which materials elevated by the skip 15 may be charged. Intermediate of the drum is a partition 16, dividing it into two compartments 17 and 18 of substantially the same size, the partition 16 having a central opening adapted to be opened and closed by a transfer door 19 which may be moved axially of the drum. The construction of the transfer mechanism and the partition form the subject matter of Patent No. 2,434,216, granted January 6, 1948, on a copending application Serial Number 566,491, filed December 4, 1944, by Andrew McMillan, one of the present applicants.

The door 19 is actuated by a mechanism 20, which comprises bifurcated members 21 in the region of the opening 14 to permit the charging skip 15 to extend between them as it enters the opening 14. For reciprocating the door 19 and the mechanism 20 there is a plunger 22 of a hydraulic ram 23, one end of which is pivotally secured to the frame, and when hydraulic fluid enters the ram, the door is moved to the left of the drawing to permit transfer of the material from the first compartment 17 to the second compartment 18. Ram 23 is hydraulically operated in one direction only, the door 19 being returned when the hydraulic pressure is released to its closed position by springs 24 connected to the mechanism 20. This mechanism comprises springs 24 which are mounted on the frame and which exert tension on a lever 25, pivotally suspended from the frame. The lever 25 is pinned intermediate its ends to the plunger of the ram 23, connection being made with the mechanism 20 by securing the upper end of the lever 25 to a shaft from which depend the arms 25', which are connected to the end of the yoke 21.

The skip 15 is elevated by cable 26 secured near its outer end, the cable being trained over pulleys 27 and 28 to a pair of winding drums, which are driven in a conventional manner through a second cable the driving end of which is wound on a drum 29 journalled on a power shaft 30; the latter is driven by the power plant of the machine. A conventional clutch 31 with interlocked brake controls the skip and causes the shaft 30 to drive the winding drum 29, the clutch 31 being shifted by a lever 32 which is actuated in one direction by the hydraulic ram 33, shown in the extended or engaged position in Fig. 1, and in the other direction by the hydraulic ram 34. The clutch 31 is of the type that once it is shifted into engagement by the ram 33, it will stay engaged, and disengagement is ordinarily effected by an automatic mechanical knockout of well known construction actuated by the skip at the end of its travel. The cylinder 34 is available merely to permit the operator to disengage the skip clutch if desired prior to its disengagement by the mechanical knockout. The ram 33 is spring loaded so that when fluid pressure is shut off from the source of fluid power, the spring will return the ram to its original position by forcing the oil back through the pipe which serves it. This takes the ram out of the way of clutch lever 32 so that full disengagement is assured when either the ram 34 or the mechanical knockout operates.

Water is introduced into the first compartment 17 of the drum concurrently with charging operations, a water tank 35 being suitably located adjacent the charging opening to store and discharge the requisite amount of water for each batch of concrete. The construction of the valves and piping leading to and from the tank 35 are not disclosed, but reference may be had to U. S. Patent No. 2,280,518 to C. F. Ball which discloses a mechanism suitable for this purpose. In that patent, a single cable connected to the control instrumentalities of the machine operates valve mechanism which permits water to flow first into the measuring tank and then, during a different interval of time, permits the desired amount of water to flow from the tank to the drum. In lieu of the cable shown in the aforesaid Ball patent, the present invention provides a hydraulic ram 36 suspended from the frame and arranged to overcome the spring loading of the valve mechanism generally designated 37 which may function in accordance with the Ball patent mentioned in this paragraph. The means for controlling the operation of the valve mechanism, however, is not the same as that of the Ball patent and constitutes one of the features of the present invention.

The contents of the second compartment 18 of the mixing receptacle are discharged by a chute 38, which may be of well known construction, said chute being arranged when in the position shown in Fig. 1 to receive the mixed concrete elevated by the blades in the final compartment and then to deliver such concrete through the opening 39 at the discharge end of the drum. The chute 38 is pivoted at 40 on the frame 12 and may be shifted to a position where it is wholly removed from the drum, in which event no material will be discharged. To move the chute between these positions, hydraulic ram 41 mounted on the frame actuates an arm 42 which is linked to the chute, the ram being positively operated in each direction by fluid pressure, as hereinafter described.

Concrete discharged from the chute 38 is received in a bucket 43 which is caused to traverse the boom 44 permitting it to be deposited in the desired position on the roadway. The bucket distributing mechanism and the means for controlling it are not shown as they form no part of this invention. Reference may be had to Ball and Hilkemeier Patents Nos. 2,284,249 and 2,295,509 for disclosure of suitable elements to perform these functions. It might be mentioned, however, that the bucket is caused to travel on the boom by engagement of a clutch in a gear case designated 45 which is mounted near the operator's position, and that the drive shaft for this mechanism, which is constantly running while the machine is in operation, is employed to drive the control instrumentalities for the hydraulic elements hereinbefore referred to.

The various hydraulic rams are all operated from a fluid control box 46 which is equipped with a plurality of hydraulic valves controlling the flow of fluid to the various actuating rams which have been described in conjunction with the major operating functions subject to their control. A fluid reservoir 47 communicates through a line 48 to the pump 49 and the latter through a line 50 to the fluid control box.

Fluid pressure is constantly available in the box and by movement of the appropriate valves, as illustrated in Fig. 1, this pressure can be put in communication with any of the following lines: the line 51 which transmits fluid to actuate the ram 41 to remove the chute from the drum and prevent discharge; the line 52 which transmits fluid to the ram 33 which engages the skip clutch; the line 53 which transmits fluid to the ram 34 to disengage the skip clutch, if desired, at any time prior to the automatic disengagement caused by the elevation of the skip to fully raised position; the line 54 which transmits fluid to the ram 23 to open the transfer door 19 and maintain it in open position for a predetermined time; the line 55 which transmits pressure to the ram 36 to thereby open the water valve leading from the tank 35 to the mixer drum and maintains it open for the desired period of time; and the line 56 which transmits pressure to the outer end of the ram 41 in order to cause the chute 38 to be returned into the drum to permit discharge of the mixed concrete.

The same hydraulic valves control the lines 52 and 53 and the lines 51 and 56 respectively, and as a result there are four control valves involved in the present embodiment of the invention. In the drawings, a fifth valve and operating lever are illustrated, but the latter are for the purpose of operating the rams which control the clutches for the two crawler track drives, and form no part of the present invention.

The construction of the valves and their system of communication with the fluid in the fluid control box are not illustrated as various conventional valves may be employed and no particular one is requisite to this invention. The valves shown are of the self-centering type, mid-position being normal, or neutral, and movement in either direction biasing the rams they control in the opposite sense. Further description of the valves will appear in the section describing the mechanism that operates them. The line 57 merely returns fluid from the fluid control box through a suitable pressure relief valve to the reservoir 47.

The control box

To obtain the desired time sequence of operation of the various hydraulic rams and likewise, and equally important, to obtain the necessary time dwell in their respective operations, two mechanical control instrumentalities are employed, one which is designated as the "mix control" and the other, the "cycle control." These controls are located in enclosed boxes or cases below the gear case 45 and above the fluid control box 46, and the valves in the latter are operatively connected to the mechanism in these two boxes.

Power for operating the mechanical controls is derived from the bucket travel gear case 45, as previously mentioned, and as illustrated in Figs. 2 and 3, a chain 58 is employed to transmit rotary motion from said power source to a sprocket 59 mounted on a shaft 60 which enters the back of the mix control box 61. An adjustable idler shoe 62 maintains the chain 58 under proper tautness. A pinion 63 at the inner end of the shaft 60 drives a bevel gear 64 mounted on a shaft 65, as illustrated in Fig. 4. A sprocket 66 secured to the end of the shaft 65 drives a chain 67 which is trained around a sprocket 68 journalled on a countershaft 69. The sprocket 68 is integral with a pinion 70 which meshes with gears 71 and 72 journalled respectively on tubular shafts 73 and 74. The shaft 73 extends through the full length of the mix control box 61 and the shaft 74, which is somewhat longer because it carries more control instrumentalities, extends through the full length of the cycle control box designated 75. The mix control box 61 is bolted or otherwise removably secured to the cycle control box 75 and the two boxes have open communication between them to permit interaction of parts as will be subsequently described.

Clutches 76 and 77 are slidably keyed to the hubs of the gears 72 and 71 respectively and are arranged, when shifted, so that their clutch teeth 78 may positively engage the respective teeth on discs 79 and 80 which are fixedly keyed to the shafts 74 and 73.

The clutch 76 as shown in Fig. 13, is actuated by a shifter arm 81 mounted on a vertical sleeve 82, journalled on shaft 82', which sleeve has an arm 83 connected to a rod 84 extending through the front of the box 75, the outer end of which is pinned as shown in Fig. 2, to a hand lever 85 journalled on a bracket 86 extending from the box. By movement of the knob 87 toward the left as viewed in Fig. 2, the clutch 76 causes the shaft 74 to rotate and starts into operation the cycle control.

The cycle interrupter

Mounted on the shaft 74 are a plurality of cams, each of which will be described separately, for controlling various functions. One of the cams (see Fig. 13) is that designated 88 which engages a follower roller mounted on an arm 89 of a bell crank 91, journalled in bracket 90; the other arm 92 of which is pin-connected to a sleeve 93 enclosing an extended part of the rod 84 previously mentioned. A spring 94, surrounding the rod 84 and adjustably compressed by a nut 95 threaded on the end of the rod, transmits force applied by the cam 88 to move the rod 84 and thereby disengage the clutch 76, by overcoming the initial compression of and by further compressing the spring 100, as hereinafter described.

The purpose of this automatic interruption of operation is to enable the operator to assure himself that the skip is clear of any trucks or other obstructions and that the cycle may safely proceed. It relieves him of the responsibility of having to manually interrupt operations should it be unsafe for the skip to be elevated. If he is satisfied before this automatic interruption occurs that the cycle may proceed without interruption, he may, by holding the knob 87 momentarily in an inward position, prevent the automatic disengagement of the cycle control clutch, for the spring 94 may be compressed sufficiently to let the follower 89 ride over the cam 88. Should the cycle be interrupted, however, all the operator has to do is to push the knob 87 inward and the clutch 76 is immediately re-engaged to resume the cycle. A lock lever 96 mounted on shaft 96' (see Figs. 2, 3 and 3a) is journalled on the bracket 86 and has an engaging surface 96" which may be moved, if desired, to the dotted line position shown in Figs. 2 and 3a to maintain the lever 85 in the outward position, insuring that the clutch 76 remains disengaged.

Cycle control operations

Figure 7:
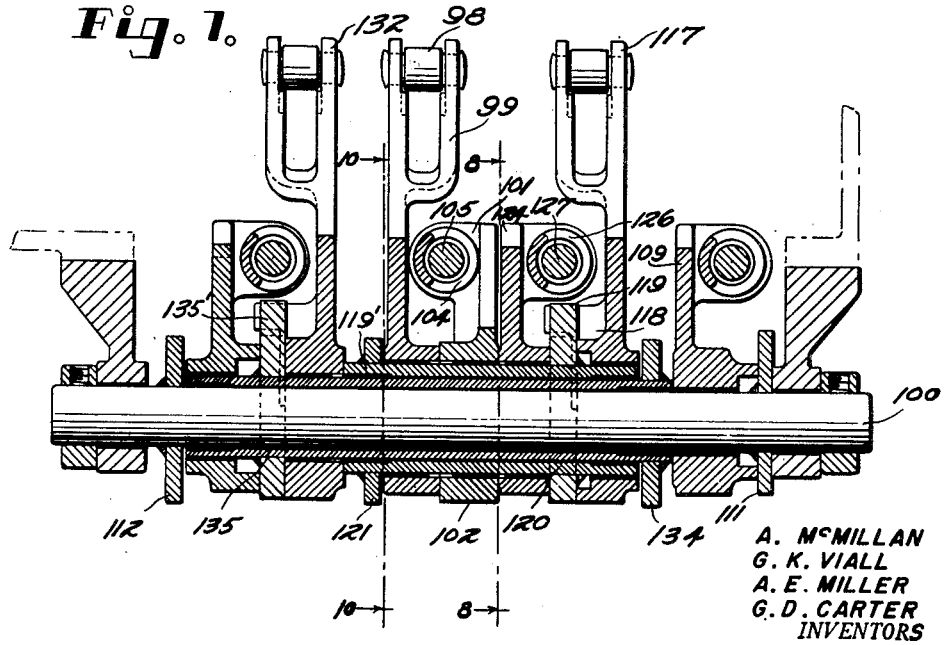
Fig. 7 is a vertical section of the assembly of cam and valve levers shown in Fig. 6.

To initiate the elevation of the skip by actuating the hydraulic control valve for ram 33, a cam 97 (see Figs. 4 and 6) driven by the cycle control shaft 74 is arranged to engage a roller 98 (see Figs. 7, 10 and 11) on a follower arm 99 disposed to the rear of said shaft and journalled indirectly on the cam follower shaft 100. Also journalled indirectly on the shaft 100 is a member 101 carrying an arm 102; the outer extremity of arm 102 is pinned to the rod 103 (see Fig. 3) which reciprocates the valve that controls the flow of fluid to the skip actuating clutch ram. Arms 99 and 101 are yieldably connected by a compression spring 104 encircling a bolt 105 which extends through apertures in ears extending from the arms. Sufficient initial compression is imposed on the spring, such that movement of the cam follower arm 99 by the cam will not cause further compression, but will move the member 101 and its actuating arm 102 through the same angle as the arm 99. Also linked to the rod 103 is a bell crank 106 journalled on a shaft 107 which is parallel to the shafts 74 and 100, but is outside the case 75. The upper arm of the bell crank 106 is provided with a knob 108, permitting the operator to operate manually the hydraulic valve. Thus knob 108 is unyieldably linked to its hydraulic control valve, so that by holding the knob 108 firmly, the operator may prevent the skip clutch from being engaged, for the spring 104 may be compressed so that no movement is imposed on member 101 when the follower is engaged by the cam. Furthermore, should the skip clutch already have been engaged by the automatic control, yield of spring 104 is sufficient so that the operator may, by moving the knob toward him and away from the cycle box, shift the valve to its opposite extreme position to open communication between the fluid pump and the line 53, whereby the ram 34 will disengage the skip clutch and prevent further elevation of the skip. Proper relationship between the cam and valve is secured through adjustment means provided on rod 103.

The hydraulic valve for operating skip clutch rams 33 and 34 is of the "open-center" type, viz., in central position of the valve, both rams are in communication with the "no-pressure" line 57. When opened by cam 97, fluid pressure is imposed on the ram 33 for the time necessary to complete its motion and cause engagement of the skip clutch.

The cam follower construction for actuating the valve which controls the automatic return of the discharge chute to non-discharging position is similar to that just described for actuating the valve which causes skip clutch engagement. In this case, the cam 110 acts upon follower arm 109 which is disposed forwardly of the shaft 74 (see Fig. 6) and is yieldably connected through a compression spring, which functions exactly as the spring 104, to an arm 111 which is secured to the shaft 100, the latter shaft carrying an arm 112, which is pinned to the valve rod 113 which actuates the valve admitting fluid through the pipe 51 to the discharge chute ram 41. The knob 114 which is at the end of the bell crank 115 that connects to the rod 113 may be employed similarly to the knob 108, to manually cause such operation, or to prevent cam actuation, or to reverse the position of the chute caused by cam actuation, whichever is desired, because of the spring connection between the arms 109 and 111.

To cause the chute to move to discharge position, the knob 114 is moved toward the cycle box 75, thereby opening the valve that admits fluid to the line 56. It will be seen that the chute may be automatically moved to non-discharge position after the cycle control shaft 74 is placed in operation, but the means for moving the chute to discharge position is manually operated.

The hydraulic valve for the discharge chute is of the "closed-center" type, which locks the chute when the valve is in neutral. Shifting to either side causes fluid actuation of the ram which operates the chute.

The hydraulic valves for controlling fluid to actuate the rams associated with the transfer door and the water valves are also of "closed-center" construction. When shifted to one position by the cams that operate them they impose fluid pressure on the rams they control to cause their extension and to maintain them in extended position when the valves are returned to neutral. After the required time interval, these valves are shifted in the opposite direction by automatic means, causing their fluid supply lines to connect with "no-pressure" line 57 and permitting the springs associated with the rams to return the rams to their original positions. However, two cams are employed for each of these valves, as the rams are operated automatically in both directions, rather than automatically in one direction only, as in the case of the skip clutch and the discharge control valves. The followers for each pair of cams, as shown in Figs. 8 and 9, are linked together so that a single operating lever may be employed to actuate each of the valves.

The cam 116 for opening the transfer door is arranged to engage the follower 117 which is disposed rearwardly of the shaft 74 and is indirectly journalled on the shaft 100. Follower 117 has an abutment 118 extending from its hub which butts against a stop 119 extending from a sleeve 120. The sleeve 120 carries the arm 121 that actuates the rod 122 which is connected to the fluid valve controlling the movement of the transfer door. Cam 123, which is set relative to opening cam 116 to provide the desired time interval between opening and closing of the transfer door, is arranged to actuate the follower arm 124 which has an abutment 125 arranged to engage the stop 119 on the opposite side from that engaged by the abutment 118 on the arm 117. The two arms 117 and 124 are normally moved together, a compression spring 126 being inserted between ears mounted on said arms, the spring being held in place by a bolt 127 which extends through aligned apertures in the aforesaid ears. Thus when the cam 116 engages the follower on the arm 117 to move the latter in a counterclockwise direction as viewed in Fig. 8, the spring transfers such movement to the follower 124 and the abutment 125 engages the finger 119 and through sleeve 119' rotates the arm 121 to effect opening of the door. The valve is maintained in this position by the cam 116 until the required time for the opening of the transfer door to be completed, whereupon rotation carries the lobe of the cam beyond the follower and permits the valve to return to neutral, leaving the ram 23 hydraulically locked in the "door open" position. After the proper time interval to allow transfer of the batch, cam 123 acts to move the hydraulic valve from neutral in the opposite direction, putting the ram in communication with "no-pressure" line 57 which permits springs 24 to collapse the ram and close the door. Action of cam 123 engages the follower on the arm 124 and moves it in a clockwise direction whereupon, through the spring 126, engagement with the abutment 118 rotates the arms 119 and 121 to move the rod 122 downwardly, thereby moving the valve in the opposite direction to that imposed by cam 116.

Spring 126 is pre-loaded and acts in the same manner as spring 104; normally the cam follower will move the arm 121, and yet the spring 126 permits the arm 121 to be moved independently regardless of the relationship that may be obtained at any moment between cams 116 and 123 and their respective followers. In addition, spring 126 permits both cams to act simultaneously, if by inadvertence this were to happen (through some maladjustment), without causing undue strain or breakage because of such opposing movements.

For controlling the movement of the water valves, the shaft 74 carries cams 130 and 131, best illustrated in Fig. 12, cam 130 serving to cause introduction of water into the mixer drum 17 and cam 131 to restore the water valves to their original position to refill the tank. The cam followers 132 and 133 which are associated with the cams 130 and 131 respectively, have abutments extending from their hubs and are linked together by spring connecting means in the same manner as the follower arms that actuate the valve controlling the transfer door. Similarly, a finger 135' (see Fig. 7) which engages the lever abutments extends from the sleeve 135 which is journalled on shaft 100 and carries the arm 134. The arm 134 actuates the rod 136 which is connected to the fluid valve controlling the movement of the water valves. Rod 136 is linked to a bell crank 137 carrying the knob 138 permitting manual operation of, or manual prevention of the automatic operation of the fluid control valve.

*The mix control*

To start the mix control shaft 73 into operation, illustrated in Figs. 13 and 14, the cycle control shaft 74 carries a cam 139 arranged at the proper time interval to actuate a follower arm 140 which is pinned at its lower extremity to the housing of the box 75. The upper extremity of arm 140 is apertured to accommodate a bolt 141 which operates, through an overtravel compression spring 142, the shifter arm 143 to engage the clutch 77 on the mix control shaft 73. To secure condign relationship between cam 139 and clutch 77, spacing of the shifter arm 143 from the arm 140 is adjusted by the setscrew 145 which is threaded through the arm 140 and bears against the shifter arm 143, to limit bias of spring 142. The cam follower is maintained in engagement with the cam by the tension spring 146.

The shifter arm 143 is mounted on a sleeve 147, journalled on a shaft 147' which is in substantial vertical alignment with the shaft 82' which journals the shifter for the clutch 76 of the cycle control shaft. Shifter arms 148 are also mounted on sleeve 147, which construction is a duplicate of shifter arms 81 mounted on sleeve 82, and when shifted the clutch teeth 78 on the clutch 77 positively engage the respective teeth on disc 80 and cause the shaft 73 to rotate. Shaft 73 carries a cam 149 as illustrated in Fig. 12, which engages a plunger 150 and causes the bell 151 on the top of the case 61 to be chimed at the proper time interval. Shaft 73 also carries a cam 152 which maintains a plunger 153 in position to prevent manual operation of the discharge chute lever 115 to cause discharge prior to completion of the mixing cycle. To this end, the lever 115 carries an ear 115' disposed in the path of the plunger 153. The plunger 153 extends through an opening in the front of the case 75 and is tensioned against the action of the cam by a spring 154 which is secured to a stirrup 155 mounted on the plunger. The upstanding arms of the stirrup carry a pin 156 arranged to abut the cam 152 when the latter moves into operating position. The land of cam 152 has a bevelled portion 152' on its trailing side to permit the spring 154 to begin to retract the plunger 153 at a time somewhat before the unlocking of the lever 115. This preliminary movement of the plunger 153 notifies the operator of the approach of completion of the mixing cycle, and tends to eliminate the human reaction time lag, for the operator will either keep his hand on the lever 115 and feel this preliminary release, or he will observe the movement of the plunger and then place his hand on the lever before complete release occurs. Upon complete release of the lever by the plunger, the operator may shift the lever inwardly and cause operation of the hydraulic ram 41, which produces movement of the chute 38 to discharge position to initiate discharge of the contents of the second compartment of the drum.

If desired, the cams 149 and 152 may be adjusted with respect to each other so that plunger 153 may be fully retracted to permit movement of lever 115 slightly in advance of the release of the plunger 150 that produces ringing of the bell 151 at the completion of the mixing cycle. The amount of this advance setting will correspond to, but not exceed, the time required for the chute 38 to move from its "out" or non-discharge position through the first part of its motion toward the "in" or discharge position, so that actual discharge of the batch is inaugurated immediately and without any time lag, upon completion of the mixing cycle. The actual time required for the chute to move through the non-effective part of its travel may be of the order of slightly less than a second, but when it is considered that the batches are produced at the rate, in many instances, of about one every 35 to 40 seconds, the cumulative effect of this time saving over the course of a day is a major advantage.

The cam 149 carries a pin 157 extending laterally therefrom, which upon each revolution of the cam trips an arm 158 that actuates a revolution recorder 159 to indicate the number of batches mixed in the machine. Neither the recorder nor the bell 151 need be described as they are well known mechanisms such as have been used for many years.

The operation of the cam 131 which serves to move the fluid valve to restore the water control valves to the tank refilling position, as previously described, is effected by a sprocket 160, carried by the shaft 73, said sprocket driving a chain 161 trained over a sprocket 162 mounted on the hub 163 (see Fig. 4) which carries the cam 131. This is done merely because the time for performance of this function is after completion of the cycle operated by the shaft 74, the mixing cycle controlled by the shaft 73 being still in operation, whereby power is available to perform this function.

*Disengagement of driving clutches for cycle control and mix control shafts*

As previously described, the clutch 76 which drives the cycle control shaft 74 is manually engaged, by operation of the hand lever 85, to start the control cycle. By operation of the lever 85, the clutch may also be disengaged at will, either prior to or subsequent to the operation of the automatic interrupter mechanism 88, 89, etc. As a result, there is provided a manually operable, over-all control for cycle functions which is in addition to the optional manual control for each of the functions.

When the shaft 74 has made a complete revolution, the roller 166 on the arm 165 (see Figs. 13 and 16) is urged into a notch 167 in the cam 164, a tension spring 168 connected near to the upper extremity of the arm 165 being employed for this purpose. Movement of the arm 165 inwardly of the cam exerts force through the setscrew 169 which bears against the arm 170 extending from the upper portion of the shifter sleeve 82. Thus as the follower drops into the notch 167, the clutch 76 is disengaged.

There is an identical mechanism for disengaging the clutch 77 which controls the drive of the mix-control shaft 73. In this instance, a notched cam 171, which is fixed to the shaft 73 is arranged to accommodate within its notch, the roller which is mounted on the follower arm 172. As shown in Fig. 14, the arm 172 is pivotally mounted at 173 on a mounting pin journalled on the box, and the arm 172 is held under tension against the cam by a tension spring 174 secured near to its upper extremity. The arm 172 is operatively connected to the shifter arm 175 which extends from the sleeve 147, and as the follower drops into the notch in the cam 171, the sleeve 147 is rocked to shift the clutch fork 148 and disengage the clutch 77. Arm 172 is connected to the shifter arm 175 by over-travel compression spring 176 which surrounds a bolt 177 extending through apertures in the arms 172 and 175. A setscrew 178 threaded through the arm 175 and bearing against the arm 175 serves to space the clutch 77 and the roller on the follower arm 172 in proper relationship by limiting bias of the spring 176. The nuts 179 threaded on the end of the bolt 177 permit proper initial compression to be exerted on the spring 176.

In the case of disengagement of the clutch for the cycle control shaft 74, there is an identical compression spring 180 adjusted by nuts 181 (see Fig. 16). Spring 180 in addition to permitting over-travel, as does the spring 176, permits the clutch 76 on the shaft 74 to be disengaged by the interrupter mechanism 88, 89, etc., or manually at any time, while the roller 166 is riding on the surface of the cam 164 during the latter's cycle. Were it not for this yieldable connection employing the compression spring 180, the shifter 81 could not be moved when the follower was out of the notch 167 because the arm 165 cannot move inwardly toward the cam.

Adjustment of cycle control

In the normal cycle of operations, upon the ringing of the bell indicating the completion of the mixing cycle, the operator will press the knob 114 toward the case thereby actuating the fluid valve to cause the discharge chute to be moved to discharge position; simultaneously therewith, he will press the knob 87 toward the case to set in motion the cycle control shaft 74. Considering for the moment only the discharge function, it is desirable to be able to vary the duration thereof because, on different jobs, the time required to discharge may vary as much as 20% or more depending upon the harshness or wetness of the mix, the tilt of the machine, or other factors. To vary this time, the cam 110 which automatically effects return of the chute to non-discharge position should be capable of adjustment relative to the shaft 74 and this is accomplished by mounting the cam 110 on a sleeve 184 which is indirectly journalled on the shaft 74 (see Fig. 4). The sleeve 184 extends through the case 75 and carries a plate 185 which is bolted to an arm 186 keyed or otherwise integrally secured to the shaft 74. By providing a plurality of angularly spaced holes in the periphery of the arm 186, the angular relation of the parts may be adjusted and the setscrew 187 which connects them may be engaged with whichever hole in the arm 186 that produces the desired setting. A dial strip 188, best illustrated in Fig. 5, mounted on the outer side of the arm 186 indicates which way to rotate the plate 185 and thereby the cam 110 relative to the shaft 74 to increase or decrease the discharge time, and may, if desired, be graduated to indicate the exact period of time allotted for this function. In practice only three positions have been found necessary, and these are "long" and "short," and an intermediate position, as indicated in Fig. 5.

Transfer from the first compartment of the drum to the second compartment should be delayed while the discharge chute is in discharge position, for otherwise the only partially mixed batch which is transferred may almost immediately start to discharge, and as a result if the period of discharge is varied, the time when transfer is to commence should also be correspondingly varied. Hence the cam 116 which effects movement of the transfer door to transfer position is mounted on the same sleeve 184 as the cam 110, and any adjustment of the setting of one cam by the mechanism 185 and 187 will cause the same corresponding adjustment in the setting of the other cam.

If the setting of the cam 116 which inaugurates transfer is adjusted, the cam 123 which effects termination of transfer should be correspondingly delayed or advanced; and in addition, the latter should be capable of separate adjustment as well, to afford additional or shorter time to effect the transfer operation. To accomplish these adjustments, the cam 123 is mounted on a sleeve 189 journalled on the shaft 74, the sleeve 189 carrying adjacent its outer end an integrally secured finger 190, the outer extremity of which is apertured to accommodate a setscrew 191 by which the finger may be connected to the plate 185 that is associated with the cam 116. A plurality of angularly spaced tapped holes in the plate 185, set on the opposite side of the plate from the tapped hole engaged by the setscrew 187, permits the finger 190 to be angularly adjusted and locked by the setscrew 191, after which the cam 123 will be driven by the shaft 74 through plate 185, the finger 190 and the sleeve 189 on which it is mounted. The dial strip 192, mounted on plate 185 carries suitable indicia, such as "long" and "short," to indicate the direction the finger 190 should be rotated to increase or decrease transfer time.

From the foregoing it will be appreciated that adjustment of the plate 185 which adjusts the setting of the cam 116 for inaugurating transfer will automatically adjust, to the same extent, the cam 123 which effects termination of transfer. The transfer time may be separately adjusted, however, without affecting the discharge time by inserting the setscrew 191 in different apertures in the plate 185, a dial strip 192 mounted on the plate 185 indicating to the operator which way to move the finger 190 to increase or decrease the transfer time.

The period of time required to elevate the skip after the skip clutch is engaged does not vary, nor is there any material variation in the time required to charge the drum once the skip is elevated, but this time should be dependent on the closing of the transfer door to prevent entrance of the incoming material into the second of the two compartments of the drum. Hence the cam 97 which inaugurates skip engagement is mounted on the same sleeve 189 as the cam 123 which effects closure of the transfer door, and skip clutch engagement is timed just sufficiently in advance of transfer closure to permit charging to commence practically simultaneously with transfer closing.

The cam 130 for effecting water introduction into the drum is normally in direct timed relation to movement of the skip, but occasionally it may be desirable to set the cam 130 more or less in advance of the skip's reaching its fully raised position. Accordingly cam 130 is journalled on the sleeve 189, and a lock nut 193 threaded on the sleeve and bearing against the cam 130 permits adjustment of the position of the cam to correspond to the numbered notches on the sleeve 189 indicating the number of seconds the water valve is opened prior to the skip's reaching the end of its upward travel.

Adjustment of the mix control

To increase or decrease the mixing time, the cam 149 which causes the bell to ring and the cam 152, which prevents premature discharge, may be adjusted relative to the mix control shaft 73 by rotating the sleeve 194 on which these cams are mounted (see Figs. 4 and 5). The sleeve 194 extends through the case 61 and carries, outside the case, a handwheel 195 to which there is secured a gear 196 arranged to mesh with a pinion 197. The pinion 197 is keyed to a shaft 198 extending through a disc 199 keyed or otherwise secured to the shaft 73. The shaft 198 is threaded at the end extending beyond the outer side of the disc 199 and a wing nut 200 is threaded on the shaft to lock the pinion against rotation relative to the disc 199 and thereby fix the cams in various radial relationships to the shaft 73. To adjust the setting of the cams, the wing nut is loosened to permit pinion 197 to rotate freely and the handwheel 195 turned relative to the disc 199, a dial 201 mounted on the disc 199 indicating, preferably in seconds, the total mixing of each batch for various settings of the handwheel relative thereto. A second dial 202 mounted on the handwheel indicates the corrections to be made if the R. P. M. of the drum is varied.

With two-compartment drums, as herein shown, the mixing time will be the interval of time elapsing between the time when the skip is fully elevated and the discharge of that same batch from the second compartment of the drum. The elevation of the skip occurs at a predetermined time interval after the inauguration of the control cycle; similarly the bell 151 will ring in the first instance at a predetermined time interval after the inauguration of this control cycle, and hence at a predetermined time interval after the elevation of the skip. Under proper operation, the control cycle is reinaugurated the moment the bell rings in the first instance, and the ringing of the bell in the second instance will totalize the complete mixing time, as may be indicated on the dial 201, of the aforesaid batch.

Since the total elapsed time for a batch of concrete to pass through the mixing drum includes the time when the succeeding batch is in the first compartment of the mixer, it follows that there will be two runs of the mixing control cycle during each mixing period. In other words, the timing instrumentality which signals the completion of the mixing cycle, is set in operation twice during the total mixing period of a given batch, first to determine when the batch in the second compartment is to be discharged, and second, after the batch in the first compartment has been transferred to the second compartment, to indicate when that batch is to be discharged. Any advance or retardation of the setting of the cams associated with the cycle control shaft, which affects the time when the mixing cycle commences, should advance or retard the setting of the cam that inaugurates the mixing cycle only one-half as much. Otherwise each adjustment of the discharge or transfer time, which only affects the time of operation on one batch, will be reflected disproportionately, by increasing or decreasing by twice as much as it should, the mixing period of each of the two batches in the drum.

The present invention provides means by which the setting of the timing instrumentalities associated with the cycle control advances or retards the completion of each mixing cycle but only in an amount which compensates for the fact that two operations of the mixing cycle are involved in each setting of these cycle control instrumentalities.

Keyed or otherwise integrally secured to the sleeve 189 is a hub 203 to which is affixed a shaft 204 on which are journalled the integral, planetary cluster gears 205 and 206, the larger of which 206 meshes with a sun gear 207 keyed to the shaft 74 (see Figs. 4 and 15). The smaller cluster gear 205 meshes with a gear 208 mounted on the hub 209 which carries the cam 139 which sets in operation the mixing control shaft 73 through the follower arm 149 and clutch shifter mechanism previously described. The gear ratios in the planetary gearing are such that rotation of the sleeve 189 by a given amount and in a given direction will rotate the hub 209 and cam 139 by only one-half as much in the same direction. Since the sleeve 189 is in turn locked to the plate 185 any adjustment by means of screw 187 of the setting of the cams which terminate discharge and inaugurate transfer will also produce the same corresponding adjustment of the commencement of the mixing control cycle in the reduced ratio described. Similarly, any adjustment of cams controlled by setscrew 191 will produce a similar effect.

Thus with this arrangement, the completion of the mixing cycle is solely dependent upon the setting of the cams on the mixing control shaft 73, and as previously mentioned their position may be adjusted by the handwheel 195, without affecting any of the functions of the cycle control. The compensated advance or retarding of the time when the mixing cycle commences does not affect the setting of the handwheel 195, which determines that the originally specified total mixing period will elapse before discharge may be effected quite regardless of the adjustments which may be made for the discharging and transferring periods.

Cycle control shaft latch

As previously described, the cycle control 74 is set in operation by the removal of the roller 166 from the notch in the cam 164 simultaneously with the movement of the clutch 76 into engagement with the clutch disc 79. When the cam 88 engages the interrupter mechanism 91, 93, 94, etc., the clutch 76 is snapped out of engagement, and the shaft 74 with its associated cams is free to rotate, since the roller 166 at this time is riding on the smooth portion of the cam 164. The force required to compress the spring 180, when clutch 76 is disengaged, is transmitted through the stronger spring 94, and exerts pressure through the roller follower against the slope of the cam 88, thereby tending to rotate the shaft 74 backward, which would permit the roller to return to its normal position and re-engage the clutch 76. To prevent this, a latch 210 is provided which locks the shaft 74 against rotation when the clutch is disengaged.

The latch 210, best illustrated in Fig. 4, has a dog tooth 211 arranged to mesh with the teeth of the disc 79 when the latch is shifted transversely to the disc. The latter movement is effected by a tension spring 212 anchored to the housing of the box. A downwardly extending pin on the lower arm of the shifter 81 engages an abutment 213 on the latch, and when the clutch is engaged the tension of the spring 212 is overcome, shifting the latch out of engagement with the disc 79, whereby the latter may rotate under power. Should the latch dog 211 fail to mesh with the teeth on the disc when the clutch 76 is disengaged, the shaft will rotate slightly backward in the manner just described, until meshing occurs. This backward rotation, while desirable in providing latching action, is exiguous, insofar as re-engaging the clutch 76.

The latch 210 is supported by two sets of parallel links 214 which are upstanding from the bottom of the case 75 and between which the spring 212 extends.

The latch 210 also serves to prevent the shaft 74 being inadvertently rotated while the control is interrupted, which would otherwise destroy the proper time sequence between the operation of the cams.

The foregoing completes the description of the operating mechanisms in the two control boxes and the correlation between their functions. The enclosed construction surrounding these mechanisms provides suitable protection for the class of service required, but the side plates may be easily removed should it be necessary to repair or replace any of the parts. A window 215 in the front panel exposes the revolution counter 159 and permits the same to be viewed. The drive shaft 60 and associated gearing, the control shafts 73 and 74, the stub shaft 69 with its associated chain and gears, are lubricated by the drip cup 216' and the system of piping 216, best illustrated in Figs. 2 and 4, which constantly supplies lubricant by gravity to the ends of these shafts. Suitably disposed apertures in the sleeves and hubs on which the cams are mounted permit the lubricant flowing along the interior of the shaft to be metered at each revolution of the shaft and to drip down to the cam and follower surfaces.

The housing for the control mechanism is mounted on the frame, as illustrated in Fig. 2, adjacent the operator's platform, and the fluid control valves are suspended from the underside of the box 75. The lower extremity of the saddle 217 in which the control valves are mounted is yieldably anchored to the frame by a hook 218 which connects it to the frame of the machine, and permits the frame to weave under extreme road conditions without stressing the control mechanisms.

The apparatus as heretofore described is suitable for practically all concrete mixing work. However, some concrete specifications may require a longer mixing period than can be obtained by the adjustment of the handwheel 195 and associated mechanism shown in Fig. 4. To meet this contingency, the apparatus may be modified as shown in Figs. 17 and 18 (wherein like elements carry the same reference characters as in the earlier figures), in which event the sleeve 194 mounted on the mix control shaft 73 is made to rotate at a slower rate of speed than the shaft 73.

The sleeve 194 is split as at 220, and a sprocket 221 is rigidly connected to that portion 222 of the sleeve on which the aforesaid handwheel 195 is mounted. A countershaft 223 adjustably mounted in brackets 224 journals a sprocket 225 which is driven by a chain 226 trained over the sprocket 221. Power from the sprocket 225 is returned to the sleeve 194 by sprockets 227 and 228 and chain 229. Sprockets 225 and 227 have a common hub 230, and by providing twice as many teeth on sprocket 225 as on sprocket 227, the speed of rotation of sleeve 194 may be reduced to one-half that of the shaft 73. In other words, the shaft 73 may make two complete revolutions while the sleeve 194 makes but one revolution.

It remains only to prevent the cam follower 166 from dropping into the notch in the cam 171, which would otherwise upon completion of one revolution, disengage the clutch controlling the drive of the mix control shaft 73, until the notch has passed the follower, and this is accomplished by providing a cam plate 231 on the sleeve 194 in position to be engaged by the pin 232 on which the roller follower 166 is mounted. The cam plate 231 is arranged so that when the shaft 73 has completed one revolution, the follower 166 is maintained in outward position by the plate 231, but upon two revolutions of the shaft 73, the plate 231 which is rotating at a differential speed relative to the shaft 73, is freed from the pin 232, and the roller 166 is permitted to drop into the notch in the cam 171. This disengages the clutch controlling the shaft 73 and the roller 166 locks the shaft against further movement.

By selecting appropriately shaped cams 234 and 149 to release the discharge chute control lock and to effect the bell signal at the end of the mixing cycle, these functions may be delayed until a suitably longer mixing period has elapsed, for the cams 149 and 234 are both mounted on the sleeve 194, which according to the modifications of Figs. 17 and 18, have an extended period of operation as hereinabove described.

In fact, the standard apparatus may be as shown in Figs. 17 and 18, with a chain coupling replacing the chains 226 and 229 and providing a direct, no speed change drive between the shaft 73 and the sleeve 194. If this is done, the pin 232 is removed, so that at no part of the adjustable range of the handwheel 195 will any engagement with the plate 231 take place, and so that the mix control shaft will come to rest exactly as shown in Figs. 1–16. A replacement cam is substituted for the cam 234, permitting operation of the control lever for the discharge chute at the proper time in the shorter cycle which is normally employed.

If the longer cycle is to be employed, utilizing the apparatus of Figs. 17 and 18, the dial strip 201 shown in Fig. 5 should be replaced by a dial strip suitably graduated for the time intervals which would be involved in this cycle.

*Summary of normal operation*

A complete normal cycle of operation of the control mechanism may be briefly summarized as follows:

1. Lever 87 is manually pushed inwardly to cause engagement of clutch 76, with consequent rotation of shaft 74, and simultaneously therewith, or approximately so, lever 115 is also manually pushed inwardly so that movement of the discharge chute 38 to discharge position is immediately inaugurated.

2. Cam 110 starts movement of the discharge chute to non-discharge position, and more or less simultaneously therewith, cam 116 causes transfer door 19 to begin movement to "open" position.

3. Cam 88 interrupts cycle, unless lever 87 is held inwardly by operator. If cycle is interrupted, lever 87 must be pushed inwardly to reengage clutch 76 and pick up cycle at point of interruption.

4. Cam 87 causes engagement of skip-hoist clutch 31, starting the skip upwardly.

5. Cam 130 opens water valve and more or less simultaneously cam 133 starts transfer door 19 toward "closed" position.

6. Skip 15 contacts the knockout which disengages the skip-hoist clutch 31 and sets the skip brake to hold the skip in elevated position. The brake is then manipulated by the operator to control lowering of the skip.

7. Cam 139 causes engagement of clutch 77, thereby initiating rotation of shaft 73 and starting timing of mixing period.

8. At one complete revolution of shaft 74, roller 166 moves into recess 167 of disc 164, disengaging clutch 76 and stopping shaft 74.

9. Cam 152 causes rod 153 to protrude, thereby preventing associated lever 115 from being manipulated prior to the requisite amount of mixing.

10. Cam 131 closes the water valve.

11. Cam 149 rings bell 151, and simultaneously therewith or slightly in advance thereof as desired, cam 152 shifts plunger 153 to unlock discharge chute control lever 115. This lever is then pushed inwardly by the operator to initiate movement of the discharge chute as described in step 1 above.

12. At one complete revolution of shaft 73, (or two complete revolutions with the modification of Figs. 17 and 18), the roller associated with disc 171 moves into the notch in said disc, whereby the clutch 77 is disengaged and rotation of shaft 73 is stopped. The final movement of shaft 73 in its cycle may overlap the recommencement of a new cycle of shaft 74, since the latter normally commences simultaneously with step 11 above.

The invention having been described, what is claimed is:

1. In apparatus for correlating the functioning of a plurality of operating instrumentalities of a two-compartment concrete mixer, including one for timing the period of mixing, the combination of a plurality of cams mounted for adjustment relative to one another; means for moving said cams through an operating cycle; means operable by certain of the cams during such cycle to control the functioning of said mixer instrumentalities other than the one for timing the mixing period; means for adjusting the setting of such cams relative to one another whereby their functioning may be varied as different mixer operating conditions require; mechanism operable by another of the cams to initiate a cycle of said timing instrumentality; and differentially operating connections between said last named cam and the other for automatically adjusting the former to a different degree than the latter when their setting is changed.

2. In apparatus for correlating the functioning of a plurality of operating instrumentalities of a two-compartment concrete mixer, including one operable through a plurality of cycles to time the mixing period of each batch, the combination of a plurality of cams mounted for adjustment relative to one another; means for moving said cams through an operating cycle; means operable by certain of the cams during such cycle to control the functioning of said mixer instrumentalities other than the one for timing the mixing period; means for adjusting the setting of such cams relative to one another whereby the timing of their functioning may be varied as different mixer operating conditions require; mechanism operable by another of the cams to initiate the cycles of said timing instrumentality; and reducing gear connections between said last named cam and the others for automatically adjusting the former to a lesser degree than the latter when their setting is changed.

3. In apparatus for correlating the functioning of a plurality of operating instrumentalities of a two-compartment concrete mixer, including one operable through two cycles to time the mixing period of each batch, the combination of a plurality of cams mounted for adjustment relative to one another; means for moving said cams through an operating cycle; means operable by certain of the cams during such cycle to control the functioning of said mixer instrumentalities other than the one for timing the mixing period; means for adjusting the setting of such cams relative to one another whereby the timing of their functioning may be varied as different mixer operating conditions require; mechanism operable by another of the cams to initiate the cycles of said timing instrumentality; and planetary gear connections between said last named cam and the others for automatically adjusting the former to substantially one half the extent of the latter when their setting is changed.

4. In apparatus for correlating the functioning of a plurality of operating instrumentalities of a plural compartment concrete mixer, including one operable through a plurality of cycles to time the mixing period of each batch, the combination of a plurality of cam-carrying elements mounted for adjustment relative to one another whereby to change the timing of the functioning of their respective cams, which change affects the time of commencement of the mixing period; means for so adjusting said cam elements; means for moving the elements through an operating cycle; means operable by the cams thereof during such cycle to control the functioning of said mixer instrumentalities other than the one for timing the mixing period; a cam mounted for cyclic movement with one of said elements, and adjustment relative thereto to change its timing; means operable by such cam to control initiation of the cycles of said timing instrumentality; and motion reducing connections between the last named cam and its associated cam-carrying element, operable through adjustment of the elements relative to one another to automatically change the setting of such cam to a lesser degree.

5. In cyclically operable apparatus for controlling the functioning of a plurality of concrete mixer instrumentalities, the combination of a plurality of sequentially functioning cams; means for operating said cams in a cycle; fluid pressure actuated means for controlling the functioning of the various mixer instrumentalities; valves for controlling said fluid pressure means; mechanisms operable by said cams for actuating said valves; manually operable means for actuating the valves independently of said cam operated mechanisms; and yieldable devices included in said mechanisms, whereby actuation of the valves by the cams may be prevented through manipulation of said manually operable means.

6. In cyclically operable apparatus for controlling the functioning of a plurality of concrete mixer instrumentalities, the combination of a plurality of sequentially functioning cams; means for operating said cams in a cycle; fluid pressure actuated means for controlling the functioning of the various mixer instrumentalities; valves for controlling said fluid pressure means; means comprising cam followers operable by said cams for actuating said valves; manually operable means for actuating the valves independently of the cams; and resilient motion transmitting devices in the cam followers, whereby actuation of the valves by the cams may be prevented through manipulation of said manually operable means.

7. In apparatus for correlating the functioning of a plurality of concrete mixer instrumentalities during a cycle of mixer operation, the combination of a casing; a cycle control shaft journalled in said casing and having a plurality of sequentially functioning cams mounted thereon; mechanism operable by certain of said cams for controlling the functioning of certain of said mixer instrumentalities; a mixing period timing shaft journalled in said casing and having a cam mounted thereon; means operable by said timing shaft cam to indicate the duration of a mixing period; common means for driving said shafts; separate means for controlling the drive from said driving means to the respective shafts; means for actuating one of said drive controlling means to initiate operation of said cycle control shaft; and mechanism operable by a cam on the cycle control shaft to actuate the other of said drive controlling means whereby to initiate operation of said timing shaft.

8. In apparatus for controlling the functioning of a plurality of concrete mixer instrumentalities during a cycle of mixer operation, the combination of a casing; a cycle control shaft journalled in said casing and having a plurality of sequentially functioning cams mounted thereon; mechanism operable by certain of said cams to control the functioning of certain of said mixer instrumentalities; a mixing period timing shaft journalled in said casing and having a cam adjustably mounted thereon; means operable by said timing shaft cam to indicate the termination of a mixing period; means for adjusting the relationship between said timing shaft and its cam whereby to vary the time of said mixing period indication; common means for driving said shafts; separate clutches for controlling the drive from said driving means to the respective shafts; manually operable means for actuating one of said clutches to initiate operation of said cycle control shaft; and mechanism operable by a cam on the cycle control shaft to actuate the other clutch whereby to initiate a cycle of said timing shaft.

9. In apparatus for controlling the functioning of a plurality of concrete mixer instrumentalities during a cycle of mixer operation, the combination of a casing; a cycle control shaft journalled in said casing and having a plurality of sequentially functioning cams mounted thereon; mechanism operable by certain of said cams to control the functioning of certain of said mixer instrumentalities; a mixing period timing shaft journalled in said casing and having a plurality of cams mounted thereon; means operable by one of said timing shaft cams to indicate the duration of a mixing period; common means for driving said shafts; separate clutches for controlling the drive from said driving means to the respective shafts; means operable manually to engage one of said clutches whereby to initiate a cycle of said cycle control shaft; means operable by a cam on the cycle control shaft to engage the other clutch whereby to initiate a cycle of said timing shaft; and mechanism associated with each shaft and controlled by a cam thereon to disengage the respective clutches upon completion of their shaft cycle.

10. In apparatus for controlling the functioning of a plurality of concrete mixer instrumentalities during a cycle of mixer operation, the combination of a casing; a cycle control shaft journalled in said casing; a plurality of sequentially functioning cams mounted upon and operable by said shaft; a cam loosely mounted on said shaft adjacent one of said shaft operated cams, such cams constituting a pair for controlling respectively the initiation and termination of functioning of one of said mixer instrumentalities; means operable by said pair of cams for effecting such control; a mixing period timing shaft journalled in said casing; means for driving said shafts; means operable by one of the cams on said cycle control shaft to control the drive of said timing shaft; and driving connections between said timing shaft and said loosely mounted cam on said cycle control shaft, whereby the functioning of such cam is controlled from said timing shaft.

11. In apparatus for correlating the operations of a plurality of concrete mixer instrumentalities, the combination of a plurality of cams mounted to function in sequence; means for moving said cams through a cycle of operation; means for controlling movement of the cams by said moving means; means operable by the cams during a cycle thereof to control the functioning of said mixer instrumentalities in timed relation to one another; and means for automatically interrupting the cycle as a precautionary measure, comprising mechanism operable by one of the cams at an intermediate point in the cycle to actuate said cam movement controlling means and thereby stop cam movement just prior to initiation of the functioning of a certain mixer instrumentality.

12. In apparatus for correlating the operations of a plurality of concrete mixer instrumentalities, the combination of a plurality of cams mounted to function in sequence; means for moving said cams through a cycle of operation; means for controlling movement of the cams by said moving means; means operable by the cams during a cycle thereof to control the functioning of said mixer instrumentalities in timed relation to one another; means for automatically interrupting the cycle as a precautionary measure, comprising mechanism operable by one of the cams at an intermediate point in the cycle to actuate said cam movement controlling means and thereby stop cam movement just prior to initiation of the functioning of a certain mixer instrumentality; and manually controlled means for actuating said cam movement controlling means whereby to resume the cycle subsequent to such interruption.

13. In apparatus for correlating the operations of a plurality of concrete mixer instrumentalities, the combination of a plurality of cams mounted to function in sequence; means for moving said cams through a cycle of operation; means for controlling movement of the cams by said moving means; means operable by the cams during a cycle thereof to control the functioning of said mixer instrumentalities in timed relation to one another; means for automatically interrupting the cycle as a precautionary measure, comprising mechanism operable by one of the cams at an intermediate point in the cycle to actuate said cam movement controlling means whereby to stop cam movement just prior to initiation of the functioning of a certain mixer instrumentality; manually controlled means for actuating said cam movement controlling means whereby to resume the cycle subsequent to such interruption; and a yieldable device in said interrupting mechanism whereby interruption of the cycle may be prevented at the volition of the mixer operator through manipulation of said manually controlled means.

14. In apparatus for correlating the operations of a plurality of concrete mixer instrumentalities, the combination of a plurality of cams mounted to function in sequence; means for moving said cams through a cycle of operation; a clutch for controlling movement of the cams by said moving means; means for shifting said clutch; means operable by the cams during a cycle thereof to control the functioning of said mixer instrumentalities in timed relation to one another; and automatic cycle interrupting mechanism connected to said clutch shifting means and operable by one of the cams at an intermediate point in the cycle to disengage the clutch, whereby to stop cam movement as a precautionary measure just prior to initiation of the functioning of a certain mixer instrumentality.

15. In apparatus for correlating the operations of a plurality of concrete mixer instrumentalities, the combination of a plurality of cams mounted to function in sequence; means for moving said cams through a cycle of operation; a clutch for controlling movement of the cams by said moving means; manually operable means for shifting said clutch; means operable by the cams during a cycle thereof to control the functioning of said mixer instrumentalities in timed relation to one another; means for automatically interrupting the cycle prior to initiation of the functioning of a certain mixer instrumentality, comprising mechanism operable by one of the cams at an intermediate point in the cycle to actuate said clutch shifting means whereby to disengage the clutch; and a yieldable connection between said clutch shifting means and interrupting mechanism for preventing the functioning of the latter at the volition of the mixer operator through manipulation by him of the clutch shifting means.

16. In apparatus for controlling the functioning of a plurality of concrete mixer instrumentalities during a cycle of mixer operation, the combination of a plurality of cams mounted to function in sequence; means for moving said cams through a cycle of operation; a clutch for controlling movement of the cams by said moving means, said clutch comprising a toothed member connected to the cams; clutch shifting means for engaging and disengaging the clutch; means operable by the cams during a cycle thereof to control the functioning of said mixer instrumentalities; and a dog mounted for movement into and out of engagement with said toothed member, whereby to prevent movement of the cams during clutch disengagement, said dog being movable in one direction by said clutch shifting means.

17. In apparatus for controlling the functioning of concrete mixer instrumentalities, the combination of a rotatable shaft normally operable through a single revolution cycle to time a mixing period; means including a clutch for driving said shaft; means for shifting said clutch to engage and disengage the same; mechanism for controlling said shifting means, including a control member carried by and rotatable with the shaft through a cycle terminating in actuation of the shifting means to automatically disengage the clutch at the completion of each shaft revolution; and means for extending the duration of the timing cycle to a plurality of shaft revolutions, comprising a second control member mounted on the shaft for movement to and from a position in which it may prevent the shifting means from disengaging the clutch under the action of said first control member, and differential-speed driving connections between the shaft and said second control member for rotating the latter at a speed different from that of the first control member, whereby to effectively position the second control member to prevent clutch disengagement only once during a plurality of shaft revolutions.

ANDREW McMILLAN.
GEORGE K. VIALL.
ARTHUR E. MILLER.
GERALD D. CARTER.

REFERENCES CITED

The following references are of record in the file of this patent:

UNITED STATES PATENTS

| Number | Name | Date |
| --- | --- | --- |
| 1,608,831 | Ball | Nov. 30, 1926 |
| 1,760,101 | Yoke | May 27, 1930 |
| 1,962,960 | Lichtenberg | June 12, 1934 |
| 2,004,234 | Blood | June 11, 1935 |
| 2,158,942 | Lundbye | May 16, 1939 |
| 2,224,801 | Sheck | Dec. 10, 1940 |
| 2,232,404 | Pratt | Feb. 18, 1941 |